June 9, 1936. C. SWANSTROM 2,043,358
HORSESHOE
Filed April 29, 1935
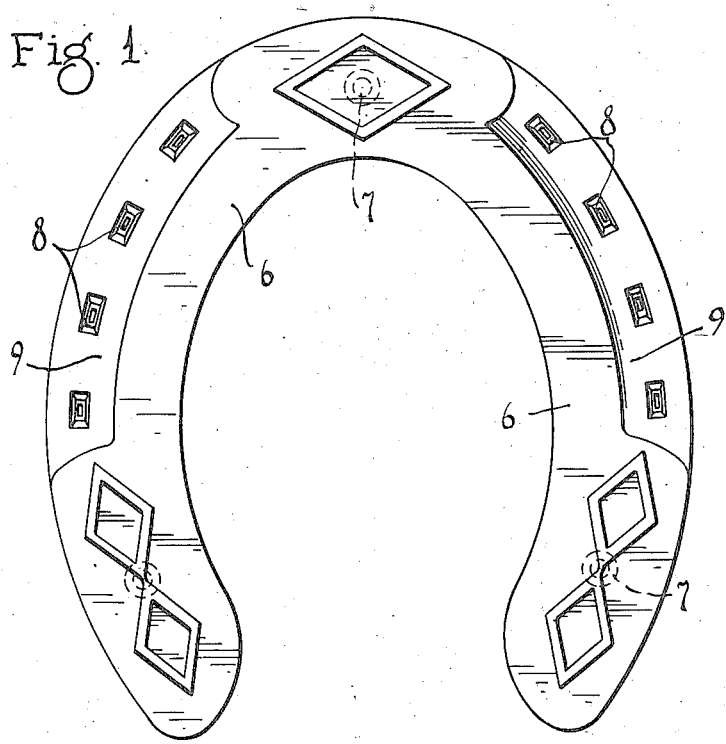
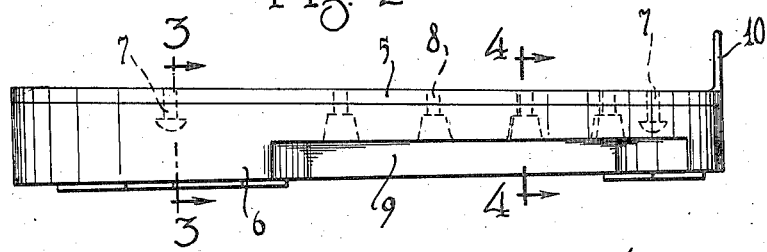
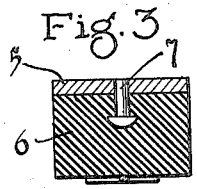 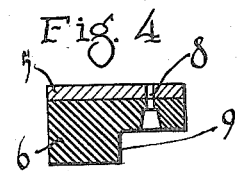
INVENTOR
Carl Swanstrom
BY HIS ATTORNEYS Patented June 9, 1936

2,043,358

UNITED STATES PATENT OFFICE 2,043,358

HORSESHOE

Carl Swanstrom, Duluth, Minn.

Application April 29, 1935, Serial No. 18,844

1 Claim. (Cl. 168—13)

This invention relates to horseshoes and more particularly to the type having a cushioned or resilient face or tread.

The object of the invention is the provision of a simple and highly efficient horseshoe that is relatively easy to manufacture and the body of which comprises a metal reinforcing plate to the face of which is applied a tread of rubber or other resilient material. This metal reinforcing plate, which is in the form of a horseshoe, has direct contact with the sole of a hoof making it possible to more securely attach the shoe to a hoof and also insure even pressure of the hoof on the shoe. The entire perimeter of the metal reinforcing plate is exposed to atmosphere throughout its entire area for keeping the shoe cooler and ventilated. The rubber tread greatly increases the life of the shoe and at the same time lends itself to an easy tread for the horse, minimizes slipping, and materially reduces the noise of a horse's tread. It has been found that when rubber or other relatively soft material is interposed between the metal of a shoe and a hoof that the shell of the hoof will wear through this material resulting in an uneven pressure of the hoof on the shoe. The give of this resilient material during the tread of a horse is also liable to unclinch the nails fastening the shoe to the hoof.

To the above end, generally stated, the invention consists of the novel devices and combinations of devices hereinafter described and defined in the claim.

In the accompanying drawing, which illustrates the invention, like characters indicate like parts throughout the several views.

Referring to the drawing:

Fig. 1 is a bottom plan view of the improved horseshoe;

Fig. 2 is a side elevation of the same; and

Figs. 3 and 4 are detail views in transverse section taken on the line 3—3 and 4—4 of Fig. 2, respectively.

The body of the improved horseshoe includes a metal reinforcing plate 5 and a resilient tread 6 of rubber or other suitable material. Said reinforcing plate 5 is flat, has substantially constant width and is in the form of a horseshoe. The rubber tread 6 is vulcanized to the under face of the reinforcing plate 5 and its perimeter is the same as that of said plate. During the vulcanizing process of attaching the tread 6 to the reinforcing plate 5, which is under extremely high pressure, the rubber cements itself to the interstices of said plate and thereby securely anchors the tread 6 to the reinforcing plate 5. To further anchor the tread 6 to the reinforcing plate 5, said plate is provided with a plurality of depending lugs 7 having on their lower ends large heads. As shown, there is one of these lugs 7 at the toe portion of the shoe and one at each heel portion thereof. These lugs 7 and their heads are molded in the rubber tread 6. It will be noted that the lower ends of the lugs 7 are materially above the under face of the tread 6 so that said tread will have to wear more than half way through before the heads of the lugs 7 are exposed.

In each wing of the reinforcing plate 5 and the respective wing of the tread 6 is a row of nail holes 8. Each wing of the tread 6 is recessed at 9 to reduce the thickness of the tread 6 at the respective row of nail holes 8, except for the recesses 8, which extend inwardly to substantially the transverse centers of the wings of the tread 6. The under face of the tread 6 on each wing of the shoe is continuous and flat from the respective heel to the toe of the shoe and it will be noted that the thickness of the tread 6 on each wing progressively diminishes from the heel to the toe of the shoe, thereby slightly tilting the heel engaging surface of the reinforcing plate 5 downwardly and forwardly which is the correct position thereof.

Formed with the toe of the reinforcing plate 5 is a clip 10, but in some instances this clip may be dispensed with.

It is important to note that the entire perimeter of the metal reinforcing plate 5 is exposed to atmosphere so that the shoe will be cooler and ventilated. The exposed perimeter of the reinforcing plate 5 also makes it possible to cold bend the shoe to fit the same to a hoof.

The upper face of the metal reinforcing plate 5 is for direct contact with the sole of a hoof, thus making it possible to more securely fasten the shoe to the hoof and at the same time have even pressure of the hoof on the shoe at all times, which is essential for the comfort of the horse.

The drawing illustrates a commercial form of the invention, but it will be understood that the same is capable of certain modifications as to details of construction, arrangement and combination of parts within the scope of the invention herein disclosed.

What I claim is:

A horseshoe, the body of which comprises a horseshoe shaped metal reinforcing plate for direct contact with the sole of a hoof, said plate being flat and of substantially a constant width, depending fixed lugs on the reinforcing plate and having on their lower ends relatively large heads, and a rubber tread cemented to the interstices of the reinforcing plate and lugs by vulcanization, the heads on the lugs being materially above the lower face of the tread, each wing of the reinforcing plate and the respective wing of the tread having a series of nail holes, said tread at each series of nail holes being recessed to reduce the thickness of the tread through which the nail holes extend.

CARL SWANSTROM.